US010489313B2

(12) United States Patent
Li

(10) Patent No.: US 10,489,313 B2
(45) Date of Patent: Nov. 26, 2019

(54) FLASH STORAGE FAILURE RATE REDUCTION AND HYPERSCALE INFRASTRUCTURE ROBUSTNESS ENHANCEMENT THROUGH THE MRAM-NOR FLASH BASED CACHE ARCHITECTURE

(71) Applicant: Alibaba Group Holding Limited, George Town, Grand Cayman (KY)

(72) Inventor: Shu Li, Santa Clara, CA (US)

(73) Assignee: ALIBABA GROUP HOLDING LIMITED, Georgetown, Grand Cayman (KY)

( * ) Notice: Subject to any disclaimer, the term of this patent is extended or adjusted under 35 U.S.C. 154(b) by 157 days.

(21) Appl. No.: 15/338,897

(22) Filed: Oct. 31, 2016

(65) Prior Publication Data
US 2018/0121109 A1   May 3, 2018

(51) Int. Cl.
*G06F 3/16* (2006.01)
*G06F 12/0866* (2016.01)
(Continued)

(52) U.S. Cl.
CPC .......... *G06F 13/1673* (2013.01); *G06F 3/064* (2013.01); *G06F 3/0611* (2013.01); *G06F 3/0656* (2013.01); *G06F 3/0679* (2013.01); *G06F 12/0246* (2013.01); *G06F 12/0866* (2013.01); *G06F 13/4068* (2013.01); *G06F 13/4282* (2013.01); *G06F 12/0895* (2013.01); *G06F 2212/214* (2013.01); *G06F 2212/222* (2013.01); *G06F 2212/7203* (2013.01); *G06F 2213/0026* (2013.01); *Y02D 10/14* (2018.01)

(58) Field of Classification Search
CPC ............. G06F 11/0736; G06F 11/0757; G06F 11/0772; G06F 11/1441; G06F 12/0895; G06F 13/1673; G06F 13/4068; G06F 13/4282; G06F 2212/222; G06F 2213/0026; G06F 3/0619; G06F 3/065; G06F 3/0656; G06F 3/0688; G06F 9/30101
See application file for complete search history.

(56) References Cited

U.S. PATENT DOCUMENTS

| 8,929,146 B1* | 1/2015 | Asnaashari | ........... G06F 3/0688 365/158 |
|---|---|---|---|
| 2009/0193184 A1 | 7/2009 | Yu et al. | |

(Continued)

FOREIGN PATENT DOCUMENTS

WO   WO-2010145967 A1 * 12/2010 ......... G06F 12/0246

*Primary Examiner* — Zhuo H Li

(57) ABSTRACT

Embodiments of the present invention provide flash-based storage with non-volatile memory components. MRAM is mainly used as a data buffer, and NOR flash is used to store metadata, such as FTL information, thereby providing non-volatile storage and significantly simplifying power failure mitigation. MRAM and NOR are jointly used to share the work performed by DRAM in existing SSDs based on the characteristics of the data stored, reducing the power consumption and cost of the SSD. The cache fault rate is reduced because both MRAM and NOR are immune from soft errors. Moreover, the working mechanisms are simplified and the power-up duration is significantly reduced because less data is copied from NAND flash, as there is no need to move all of the FTL information back to NAND flash at power off.

20 Claims, 6 Drawing Sheets

(51) Int. Cl.
  *G06F 12/02* (2006.01)
  *G06F 3/06* (2006.01)
  *G06F 13/40* (2006.01)
  *G06F 13/42* (2006.01)
  *G06F 12/0895* (2016.01)
  *G06F 13/16* (2006.01)

(56) References Cited

U.S. PATENT DOCUMENTS

| | | |
|---|---|---|
| 2009/0240873 A1 | 9/2009 | Yu et al. |
| 2009/0310408 A1 | 12/2009 | Lee et al. |
| 2010/0023682 A1 | 1/2010 | Lee et al. |
| 2010/0023800 A1 | 1/2010 | Harari et al. |
| 2010/0082890 A1 | 4/2010 | Heo et al. |
| 2011/0040924 A1 | 2/2011 | Selinger |
| 2011/0041005 A1 | 2/2011 | Selinger |
| 2011/0041039 A1 | 2/2011 | Harari et al. |
| 2011/0093650 A1 | 4/2011 | Kwon et al. |
| 2011/0161554 A1 | 6/2011 | Selinger et al. |
| 2011/0161784 A1 | 6/2011 | Selinger et al. |
| 2011/0238900 A1 | 9/2011 | Heo et al. |
| 2011/0238971 A1 | 9/2011 | Heo et al. |
| 2011/0299335 A1 | 12/2011 | Lee et al. |
| 2011/0299338 A1 | 12/2011 | Lee et al. |
| 2011/0302352 A1 | 12/2011 | Lee et al. |
| 2011/0302468 A1 | 12/2011 | Lee et al. |
| 2011/0302476 A1 | 12/2011 | Lee et al. |
| 2011/0307646 A1 | 12/2011 | Lee et al. |
| 2012/0284587 A1 | 11/2012 | Yu et al. |
| 2013/0111113 A1 | 5/2013 | Harari et al. |
| 2013/0145085 A1 | 6/2013 | Yu et al. |
| 2013/0275657 A1 * | 10/2013 | Kim ............... G06F 3/0613 711/103 |
| 2014/0006688 A1 | 1/2014 | Yu et al. |
| 2014/0025874 A1 | 1/2014 | Kwon et al. |
| 2014/0250348 A1 | 9/2014 | Harari et al. |
| 2014/0281151 A1 | 9/2014 | Yu et al. |
| 2014/0304475 A1 | 10/2014 | Ramanujan et al. |
| 2017/0277464 A1 * | 9/2017 | Yoon ............... G06F 11/1441 |

* cited by examiner

FLASH STORAGE FAILURE RATE REDUCTION AND HYPERSCALE INFRASTRUCTURE ROBUSTNESS ENHANCEMENT THROUGH THE MRAM-NOR FLASH BASED CACHE ARCHITECTURE

FIELD

Embodiments of the present invention generally relate to the field of data storage. More specifically, embodiments of the present invention relate to hyperscale infrastructures for data storage with a reduced failure rate.

BACKGROUND

Rapidly growing technologies such as data analytics, database technology, and cloud services demand low-latency, non-volatile solution to hold vast amounts of data. Flash storage devices, such as solid-state drives (SSDs) are widely used in data center environments. SSD technology often includes interfaces compatible with traditional block input/output (I/O) hard disk drives. As opposed to traditional electromechanical magnetic storage, SSDs generally have no moving mechanical components. Therefore, SSDs are typically more resistant to physical shock, provide lower access time and lower latency, and run without generating detectable noise.

Currently, many SSDs use dynamic random-access memory (DRAM) to implement caches for holding data and instructions, where a loss of power can lead to a permanent loss of data. DRAM may be used as the write cache to receive the user data so that when the user data is held in DRAM, the SSD can acknowledge to the host that the current write operation has completed successfully, and then physically writes the data into NAND flash. This mechanism is known as "write-back".

To accelerate programming and read operations, NAND flash devices have included internal DRAM used as both a read cache and a write cache. By configuring the cache using write-back instead of write-though, when data resides in DRAM, flash devices acknowledge to the host that the current data has been safely written. In this way, the write latency is greatly reduced from hundreds of microseconds to tens of microseconds, and the main cause of latency results on the transfer path. For the read cache, depending on the hit rate, data acquisition is accelerated and comprises shorter average latency. However, there is difficulty in enforcing the data integrity of the internal DRAM cache, and it is extremely challenging for NAND flash devices with large cache content. The current strategy to enforce the data integrity is an additional backup battery unit (BBU) for flash devices. When a power failure occurs, the BBU provides sufficient power to write the data from DRAM to NAND flash for permanent storage.

There are several drawbacks to using a BBU. For example, when the battery is being charged, other device modules cannot receive maximum power. Furthermore, the use of a DRAM-based architecture can also lead to long wait time at power up, high power consumption, high total cost of ownership (TCO), and suboptimal usage of NAND flash, for example. Therefore, there is a strong desire to avoid the use of DRAM-based caches and BBUs on single devices, such as Peripheral Component Interconnect Express (PCIe) SSDs, host bus adapter (HBA) cards, etc. What is needed is a flash storage device that combines the power loss protection features of BBUs without the added cost and complexity inherent in battery units.

SUMMARY

Embodiments of the present invention provide SSD-based storage with nonvolatile memory components. MRAM is mainly used as a data buffer, and NOR flash is used to store FTL information, providing non-volatile storage and significantly simplifying power failure mitigation. MRAM and NOR flash are jointly used to share the work performed by DRAM in existing SSDs based on the characteristics of the data stored, reducing the power consumption and cost of the SSD. Both MRAM and NOR are immune from soft errors, so the cache fault rate is reduced. Moreover, the working mechanisms are simplified and the power-up duration is significantly reduced because less data is copied data from NAND flash to DRAM. When FTL information is secured in nonvolatile memory, there is no further need to move all of the FTL information back to NAND flash at power off.

According to one embodiment, a flash storage device is disclosed. The flash storage device includes a PCIe interface for communicating with a host, a flash memory controller core coupled to the PCIe interface, a NAND flash interface coupled to the controller core and a plurality of NAND flash units, an metadata storage unit coupled to the controller core for storing metadata using NOR flash, and a data buffer for storing data using MRAM.

According to another embodiment, a flash storage device is disclosed. The flash storage device includes a PCIe interface for communicating with a host, a flash memory controller core coupled to the PCIe interface, a NAND flash interface coupled to the controller core and a plurality of NAND flash units, a metadata storage unit coupled to the controller core for storing metadata using a first non-volatile internal cache, and a data buffer for buffering data using a second non-volatile internal cache.

The MRAM and NOR flash architecture forms a dual-source response system. This means that FTL information can be simultaneously read out from two sources to accelerate the multiple write operations in the write queue to further mitigate write latency.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
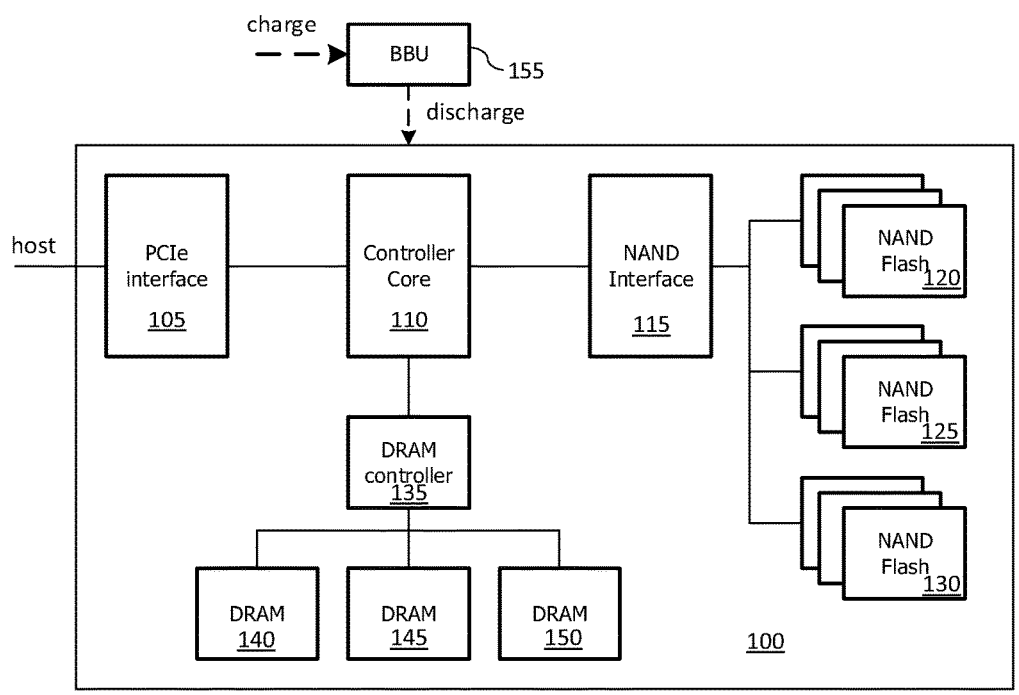
FIG. 1 is a block diagram of an exemplary flash storage device 100 for storing data using traditional DRAM and NAND flash.

Reference is made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 3-6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention provide flash-based storage with nonvolatile memory components. MRAM is mainly used to implement a data buffer for managing random write operations, and NOR flash is used to store metadata (e.g., FTL information) and manage read and sequential write operations, thereby providing non-volatile storage and significantly simplifying power failure mitigation. MRAM and NOR are jointly used to share the work performed by DRAM in existing SSDs based on the characteristics of the data stored, thereby reducing the power consumption and cost of the SSD. The cache fault rate is reduced because both MRAM and NOR are immune from soft errors. Moreover, the working mechanisms are simplified and the power-up duration is significantly reduced because less data is copied data from NAND flash, as there is no further need to move all of the FTL information back to NAND flash at power off.

Because metadata must be read frequently with short latency, embodiments of the present invention use NOR flash for holding metadata. NOR flash offers several advantages, including non-volatile storage, lower cost, lower power consumption, and immunity to soft errors compared to DRAM. The metadata may be used for routine SSD operations, such as flash translation layer (FTL) information operations. Embodiments of the present invention use non-volatile cache for SSDs, and a write-back cache is implemented using magnetic RAM (MRAM). The DRAM used for providing low read latency in existing SSDs is replaced with MRAM and NOR flash.

The NAND flash is used for storing data such that all NAND blocks are in the same pool for management optimizations. This benefits the system reliability and the NAND flash usage. Embodiments of the present invention separate data and FTL information (metadata) to improve NAND flash efficiency. Garbage collection is no longer commingled with the metadata, and those blocks formerly used for metadata are used as normal multi-level cells (MLCs) in the overall block pool for wear leveling and garbage collection optimization. Some embodiments of the present invention provide a dual-source FTL searching method to accelerate the write operations stacked in queues.

With regard to FIG. 1, an exemplary flash storage device 100 for storing data using traditional memory DRAM (e.g., DRAM 140, 145, and 150) and NAND flash (e.g., NAND flash 120, 125, and 130) is depicted. Current PCIe-based flash storage systems may provide access capacity of roughly 1 million I/O accesses per second using a 4 kb block size, and multiple parallel PCIe 3.0 lanes provide considerable throughput. However, the latency of programming and read operations are relatively long. MLC NAND flash, for example, requires roughly 300-1000 microseconds to perform one programming operation of a physical NAND cell, and roughly 100 microseconds to complete one read operation.

In order to accelerate programming and read operations, the flash storage device 100 depicted in FIG. 1 implements internal DRAM for use as both a read cache and a write cache using DRAM controller 135. The cache is configured using write-back, instead of write-through, where the flash devices stores the data in DRAM and acknowledges to the host once the data has safely been written. Using this configuration, the write latency is reduced from hundreds of microseconds to tens of microseconds. The main latency now is on the transfer path. For the read cache, depending on the hit rate, data acquisition is also accelerated with the shorter average latency.

Still with regard to FIG. 1, the inherent latency of NAND flash read operations may be unable to meet latency requirements, and consequently, the data has is pre-loaded into DRAM after power-up, where mapping information and meta-data is loaded from the NAND flash memory using NAND interface 115 into DRAM using DRAM controller 135. Controller core 110 performs routine SSD operations, such as wear leveling, sequential writing, garbage collection, etc.

Flash storage system 100 uses traditional DRAM as a cache, and it may be difficult to enforce the data integrity of the DRAM cache. This is especially true in the case of flash devices with relatively large cache content. To help maintain the data integrity of the DRAM cache, Flash storage device 100 includes a batter backup unit (BBU) 155 that provides sufficient power supply in the case of a loss of main power, such that the flash device is able to write data from the DRAM cache to NAND flash for permanent storage.

Unfortunately, using a BBU in this way inherently causes performance deterioration of the flash device caused by periodical charge and discharge operations. It has been observed that BBUs have a much higher failure rate than the other parts of flash storage. When using DRAM together with a battery, one crucial issues encountered in practice is the performance loss observed when charging or recharging the battery itself. The battery may lose charge over time, and therefore, to guarantee the functionality of battery, the charge of the battery must be checked periodically. As long as the charging level is below a pre-set threshold, the battery must to be discharged and recharged to restore the battery to a fully charged status.

Flash storage devices that operate at a high level of performance generally require peak power consumption. However, the on-device battery shares the same power supply source with the other modules of the flash storage device. Therefore, during battery charging, the other modules do not receive the maximum power supply. For example, the current PCIe slot maximally supports a peak power consumption of 25 watts. The top performance of a PCIe SSD generally leads to the 25 watt power consumption. Charging allocates a certain percentage of that power supply, and the PCIe SSD's performance must be throttled due to the limited power budget.

In general, the battery-backed scheme suffers from both high device failure rate and the device performance loss. Furthermore, the battery is disposed on the flash storage device and must possess sufficient capacity. Therefore, the battery's physical size and dimensions may be considerable. In sum, based on the signal and power integrity that must be taken into account, battery-backed schemes greatly increase the design difficulty of a flash storage device.

Still with regard to FIG. 1, the amount of DRAM required to implement the metadata buffer is proportional to the capacity of PCIe SSDs; the larger the capacity of the SSD, the more DRAM is required to buffer the metadata. However, in many scenarios, the flash storage device may be unable to re-write the entire SSD in a short period. This means the metadata buffered in DRAM will rarely be completely changed in a short period. A diskful write per day (DWPD) metric may be used to evaluate how much data is written into the SSD in a 24 hour period. As SSD capacity keeps increasing, when used as a storage device, the SSD's meta-data is updated much more slowly than the DRAM memory in the server.

Because the metadata needs to be read frequently with short latency, NOR flash may be better suited in most cases for holding metadata. As mentioned, NOR flash offers several advantages over traditional forms of memory, including the non-volatile property, lower cost, lower power consumption, and immunity of soft errors. The metadata is mainly used for routine SSD operations, including FTL (flash translation layer) information, for example.

The DRAM illustrated in FIG. 1 is used as the write cache to receive user data. As long as the user data is held in DRAM, the SSD acknowledges to the host using PCIe interface 105 that the current write operation has been accomplished, and physically writes the data into NAND flash at a later time. This mechanism is called write-back. Other embodiments of the present invention implement the write-back cache using magnetic RAM (MRAM) for the non-volatile cache. In these embodiments, the DRAM used for providing low read latency is replaced with both MRAM and NOR flash.

Figure 2:
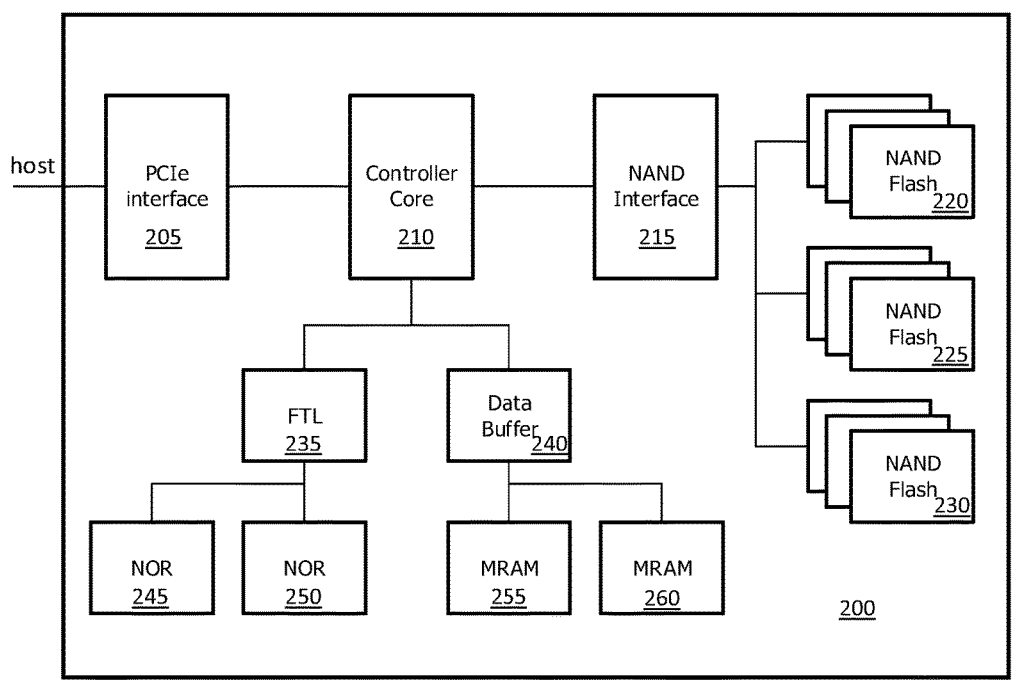
FIG. 2 is a block diagram of an exemplary flash storage device for storing data using NOR flash and MRAM depicted according to embodiments of the present invention.

With regard to FIG. 2, an exemplary flash storage device 200 for storing data using NOR flash and MRAM is depicted according to embodiments of the present invention. PCIe interface 205 is used to communicate with a host system or device. Controller core 210 manages the data stored on flash device 200 and communicates with a host using PCIe interface 205 to send and receive data. Controller core performs basic SSD operations, such as garbage collection, wear leveling, and sequential writes, for example. Controller core 210 is connected to NAND interface 215 to read and store data using NAND Flash 220, 225, and 230. Controller core 210 is connected to FTL 235 and Data Buffer 240.

FTL 235 uses NOR flash 245 and 250 for storing a metadata pool comprising FTL information, for example. Data Buffer 240 is used to buffer metadata and is implemented using MRAM flash 255 and 260. The MRAM and NOR flash are non-volatile, and can directly backup each other's data to enhance reliability. The FTL information stored in NOR flash memory is byte-addressable, such that the time and power intensive FTL loading step is not necessary. This significantly reduces the waiting time of the flash storage device upon power-up or restart. LBAs are first checked against the LBA in the MRAM read cache, and may be read out from the data cache; otherwise, if the data is not in the cache, the requested data is read out from the NAND flash pages. In case of read cache miss, the host LBA is translated using the FTL information stored in NOR flash into a PBA which is accessed to read the data.

Figure 3:
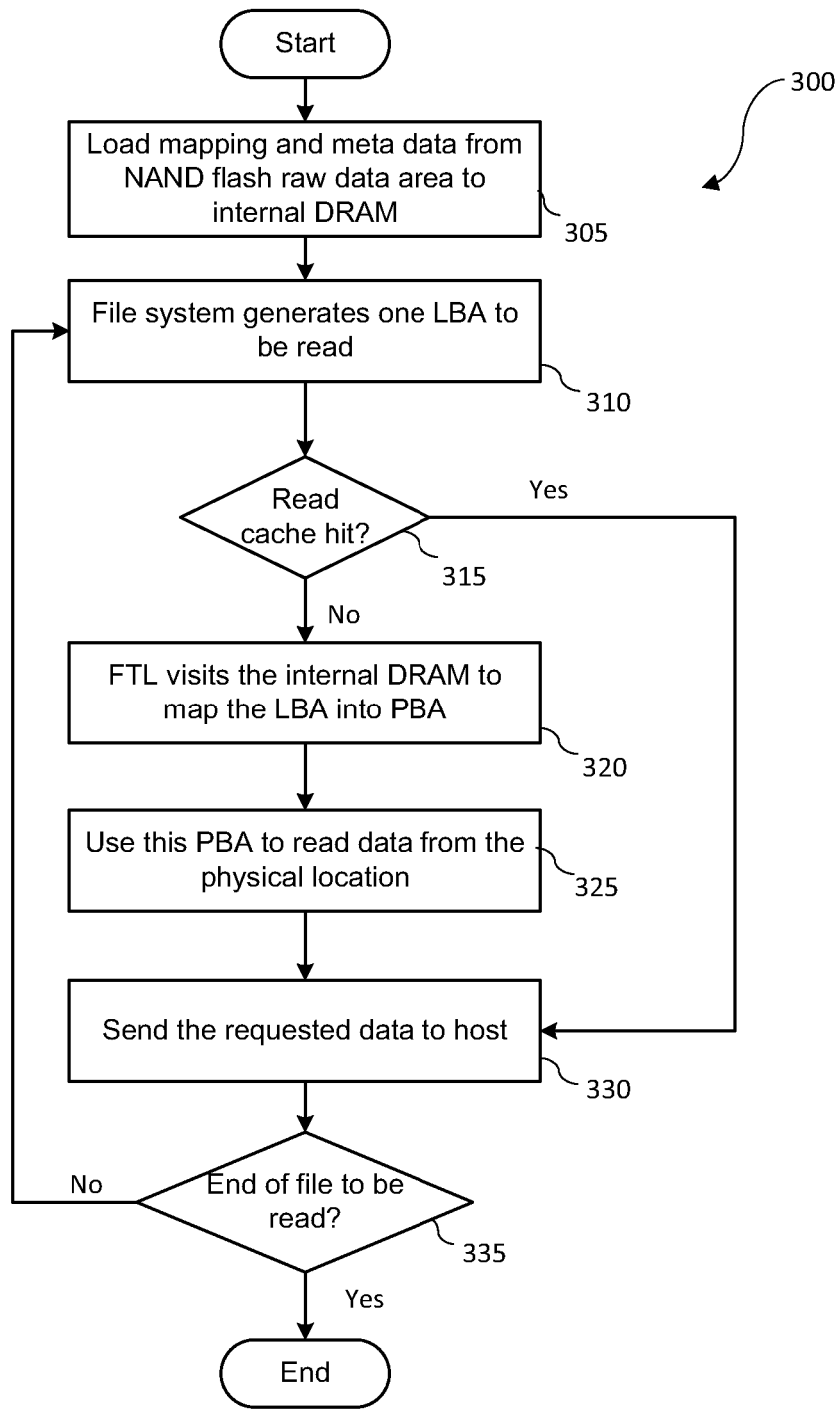
FIG. 3 is a flow chart depicting an exemplary sequence of computer-implemented steps for performing a read operation for a flash storage device having a DRAM cache.

With regard to FIG. 3, a flow chart depicting an exemplary sequence of computer-implemented steps for performing a read operation for a flash storage device having a DRAM cache is depicted.

At step 205, when the flash storage device (e.g., an SSD) is powered up, FTL information is read out from NAND flash and written into DRAM. Periodically, the FTL information in the internal DRAM of SSD is synchronized into NAND flash. When power is lost (either planned or accidental), the FTL information is DRAM is written into NAND flash within a limited time period.

During a read operation, when the requested data does not reside in the cache (step 315), the SSD receives the LBA (logical block address) from host at step 310. The FTL information is read to map the LBA to PBA (physical block address) at step 320, and the PBA is used to fetch the requested data at step 325. The data is read out from NAND page into page buffer with NAND flash IC, then transferred to the internal DRAM cache for sending to host at step 330.

The portion of the DRAM holding the requested data also serves as read cache. In other words, when one LBA is loaded into internal DRAM, and the host quickly sends another request for this LBA, instead of fetching data from NAND flash, the data in the internal DRAM can be sent out directly. This referred to as a read cache hit, which means we can find the data in the read cache at step 315. In the case of a read cache hit, the requested data is sent to the host at 330. The above process is repeated until the end of the file has been reached at step 335, and the process ends.

Figure 4:
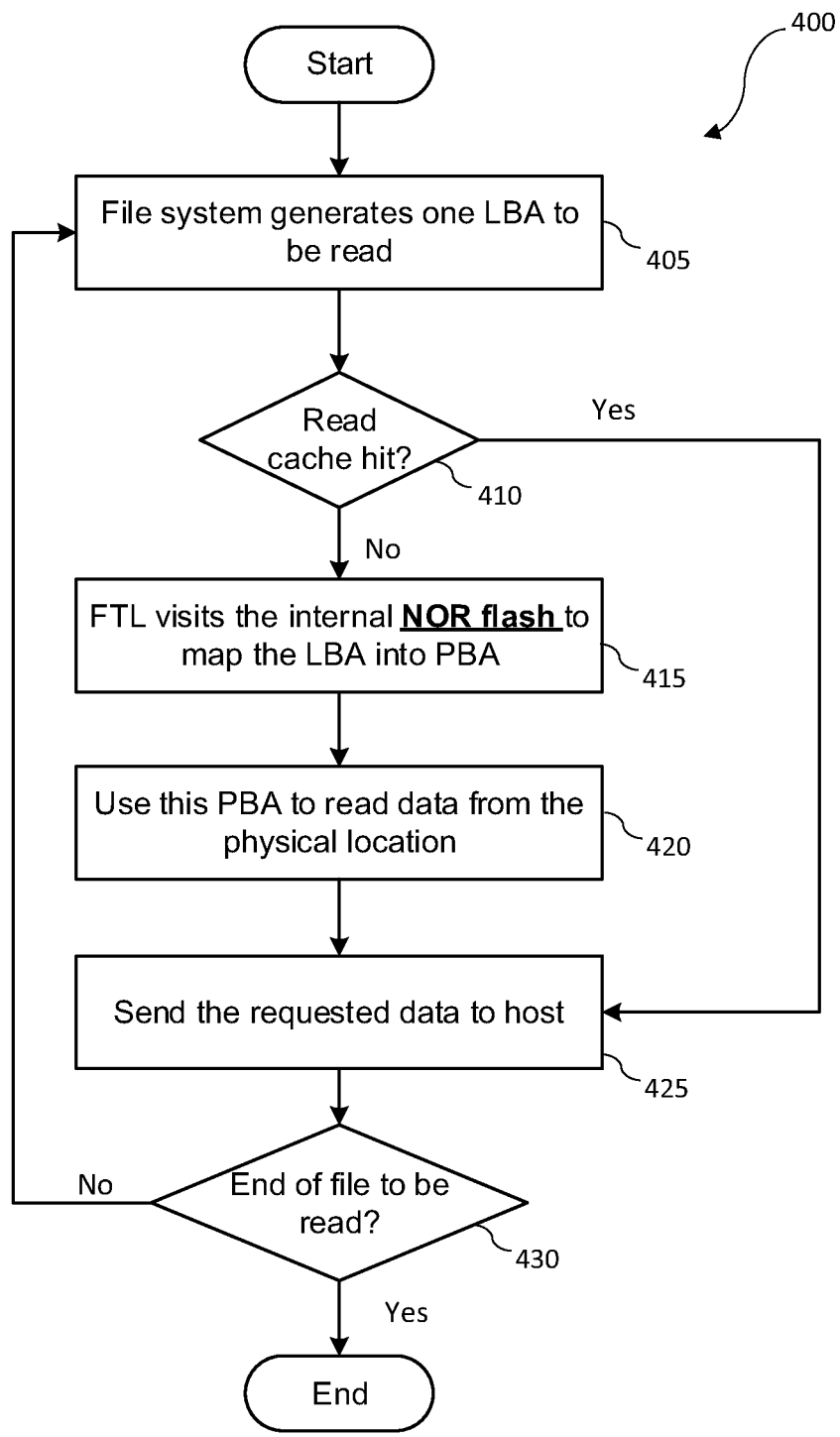
FIG. 4 is a flowchart of an exemplary sequence of computer-implemented steps for performing a method of reading data using an MRAM-NOR internal memory scheme depicted according to embodiments of the present invention.

With regard to FIG. 4, a flowchart 400 of an exemplary sequence of computer-implemented steps for performing a method of reading data using an MRAM-NOR internal memory scheme is depicted according to embodiments of the present invention. The MRAM serves as a data buffer, and the NOR flash stores metadata (e.g., a metadata pool). Flash transition layer (FTL) information is stored in byte-addressable NOR flash memory, and the method does not require the time and power intensive FTL loading step, which significantly reduces the waiting time on SSD power-up or restart. The MRAM and NOR flash are non-volatile, and can directly backup each other's data to enhance reliability.

At step 405, a file system generates a logical block address (LBA) to be read. When the SSD receives the LBA from the host file system, the LBA is checked against an LBA in the read cache at step 410. In the case of a match, the data is read out from the MRAM data cache and sent to the host at step 425; otherwise, the requested data is read out from the NAND flash pages. In the case of a read cache miss, the host LBA is translated using the FTL information from NOR flash into the associated PBA at step 415, and the data at the physical location is accessed at step 420.

At step 425, the requested data is sent to the host. At step 430, if the end of the file is reached, the process ends; otherwise, the process returns to step 405, and a new LBA is generated.

When writing data, MRAM is used as a write cache to briefly hold user data and one or more LBAs, and NOR flash stores the FTL information. In this way, the write-back cache implemented using MRAM ensures a short write latency. The MRAM also works as a read cache for FTL information for a subsequent write, where the FTL information is read out from NOR flash and updated.

Before the updated FTL information is written into NOR flash, the modified FTL information is temporarily stored in MRAM. For example, when a user may revise/update one file and stores it in an SSD. The file system then partitions this file into LBAs, and locates the LBAs associated with the update. Then, the changes are written into the corresponding PBA. However, the SSD cannot directly overwrite the same page, so the changes will be write into a free page, and the SSD marks the original page as invalid. Using a modified LBA-to-PBA mapping, the former LBA now is mapped to a different PBA.

Figure 5:
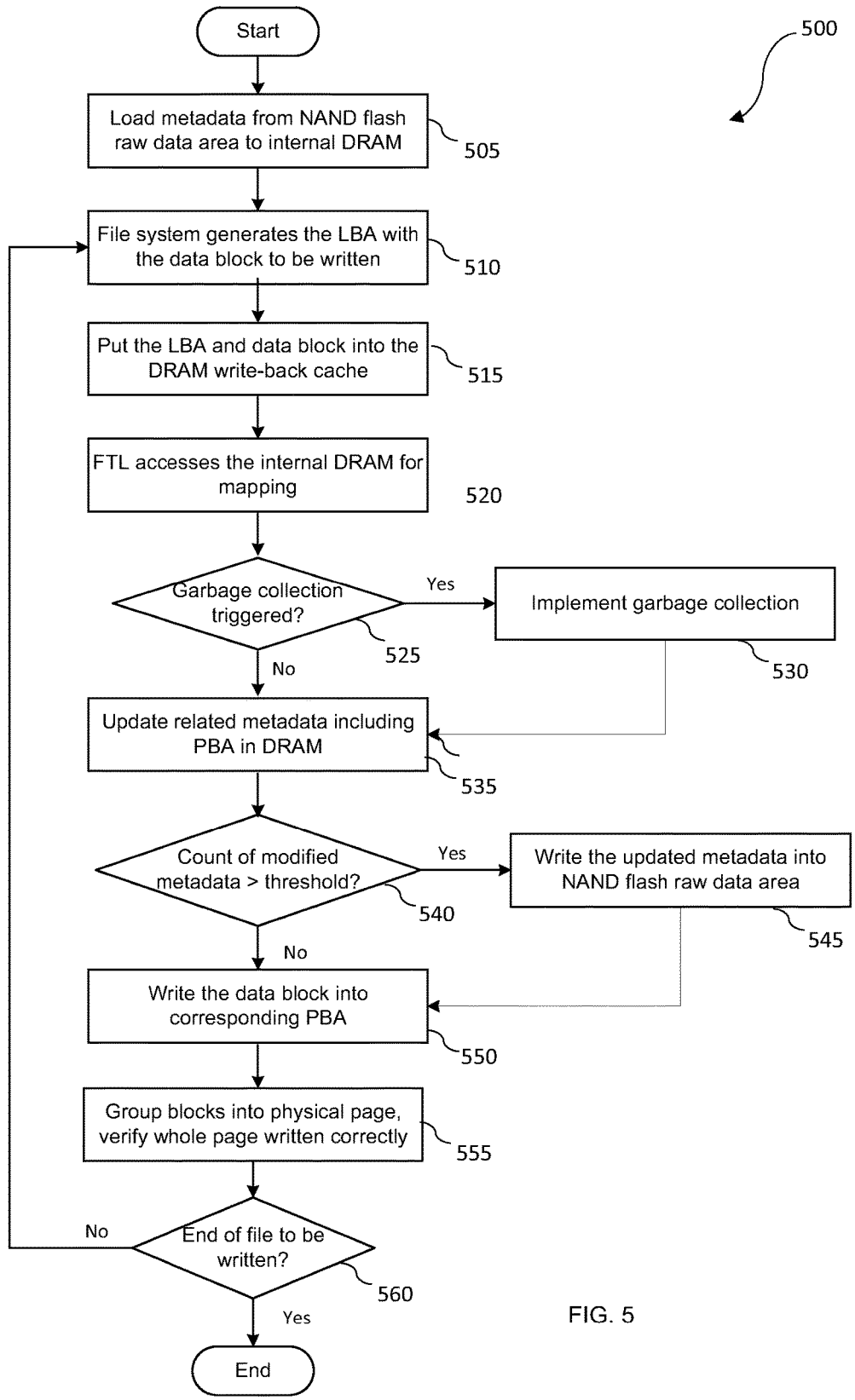
FIG. 5 is a flowchart depicting an exemplary sequence of computer-implemented steps for performing a method of writing data to a flash storage device having a DRAM cache.

With regard to FIG. 5, a flowchart depicting an exemplary sequence of computer-implemented steps for performing a method of writing data to a flash storage device using a DRAM cache is depicted.

At step 505, metadata is loaded from NAND flash into the internal DRAM cache. At step 510, the write operation receives the data to be written and the LBA from host, and this information is buffered using the internal DRAM cache at step 515. At this point, the SSD can acknowledge to the host that this write is done.

At step 520, a FTL accesses the internal DRAM for address mapping, and at step 525, depending on the current utilization of the flash storage device, garbage collection (GC) may be triggered. If GC is launched, at step 530, the controller consumes bandwidth to implement the copy out and write back operations during GC. After GC is done, some blocks formerly marked as invalid are erased to provide several blocks ready to be written to at step 535.

At some point, the FTL information must be flushed into NAND to ensure the data integrity (step 545). For example, a flush rule may be based on a modified count of LBAs in the FTL information, and further based on the time duration that modified information remains in DRAM. When either condition is met (step 540), the FTL information is flushed into NAND (step 545).

At step 550, the data block is then accessed and written to the corresponding PBA. Several blocks are grouped into a physical page at step 555, and the entire physical page is verified to ensure the data was written correctly. At step 560, unless the end of the file to be written has been reached, the process returns to step 510, and subsequent steps are repeated.

Figure 6:
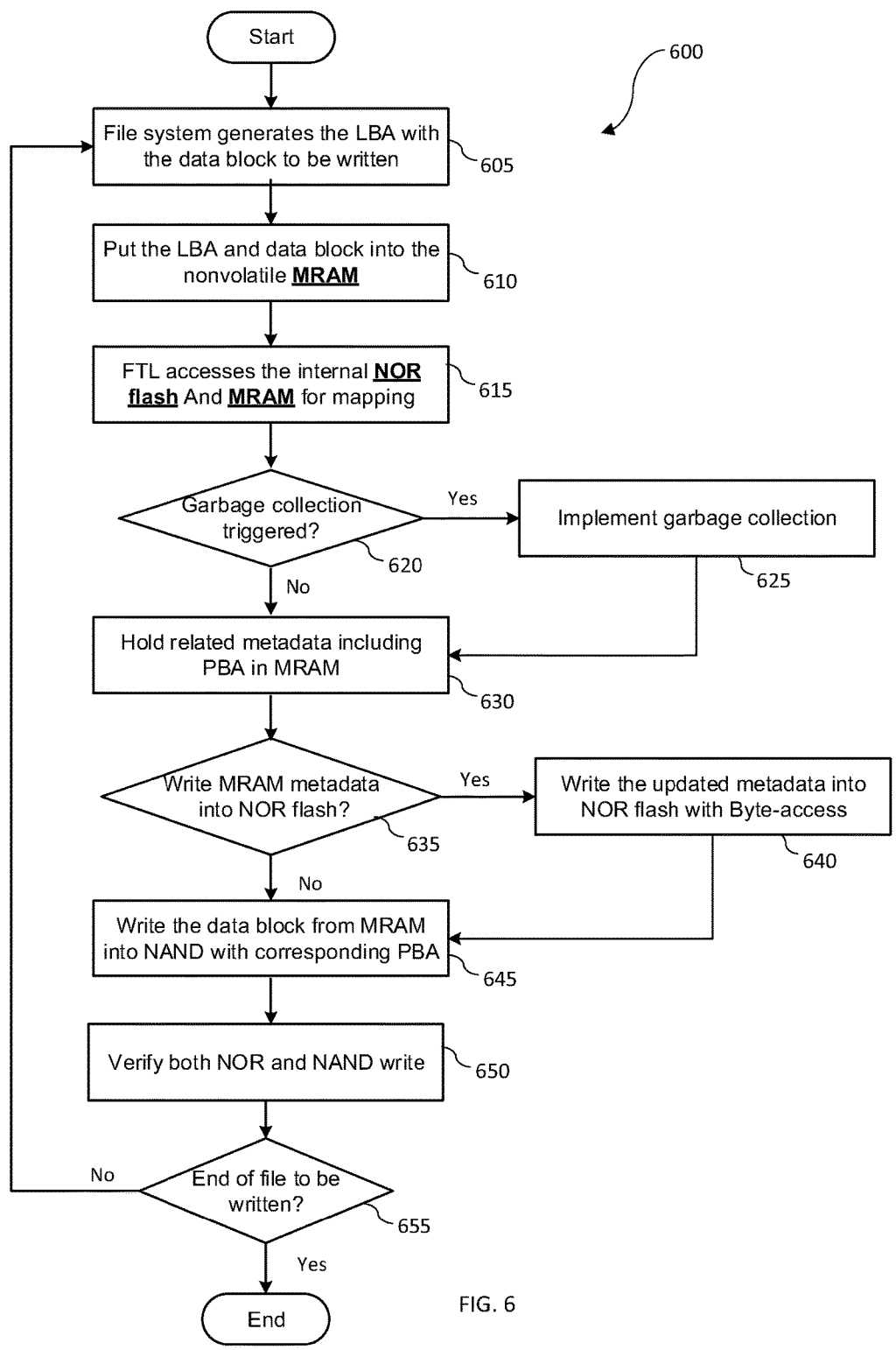
FIG. 6 is a flowchart of an exemplary sequence of computer-implemented steps for performing a method of writing data to a flash storage device using a non-volatile internal cache scheme depicted according to embodiments of the present invention.

With regard to FIG. 6, a flowchart depicting an exemplary sequence of computer-implemented steps for performing a method of writing data to a flash storage device using a non-volatile internal cache scheme is depicted according to embodiments of the present invention.

At step 605, the file system generates an LBA with the data block to be written. At step 610, the LBA and data block are stored in nonvolatile MRAM. At step 615, The FTL accesses the internal NOR flash and MRAM for mapping the addresses. As a FTL information read cache, MRAM is searched to find the incoming LBA. If a match is identified, there is no need to read NOR flash; otherwise, if no match is identified, the NOR flash is read for the necessary FTL information. This read cache accelerates the write operation.

If garbage collection is triggered, the garbage collection process begins at step 625. If garbage collection is not triggered, or has already been implemented, the process moves to step 630, where the related metadata, including the PBA, is stored in MRAM. At step 635, it is determined if there is metadata stored in MRAM that is to be written into NOR flash. If so, at step 640, updated metadata is written into NOR flash.

The FTL information related operations described in regard to FIG. 5 causes GC and wear of NAND flash blocks. Furthermore, both FTL information and the actual data are stored in NAND. When power fails, a considerable amount of data must be written into NAND. This is very challenging for the BBU-based power fail feature to overcome. Instead, the embodiment described in FIG. 6 separates the FTL information from the actual data, and stores the FTL information and the actual data into NOR flash and NAND flash, respectively. NOR flash itself is byte-addressable, so there is no concern about garbage collection operations. NOR flash also has better endurance than MLC NAND flash. These advantages enable the flash storage device to store FTL information more reliably.

As mentioned, the metadata written into NOR flash is byte-addressable. At step 645, the data block in MRAM is written into NAND with the corresponding PBA. At step 650, the NOR and NAND writes are verified. At step 655, the process ends if the end of the file has been reached. Otherwise, the process returns to step 605 and the process is performed until the end of the file is reached.

As described, embodiments of the present invention implement NAND flash to store the data itself (data that is not metadata), so with the same raw NAND capacity and the same user capacity, embodiments of the present invention provide higher SSD over-provisioning, leading to more efficient garbage collection and management.

According to some embodiments, the write flow described with regard to FIG. 6 may be used to read both NOR and MRAM in parallel. The MRAM and NOR flash architecture forms a dual-source response system. This means that FTL information can be simultaneously read out from two sources to accelerate the multiple write operations in the write queue to further mitigates write latency. For example, when two individual applications are reading two independent LBAs, rather than checking DRAM one-by-one to retrieve the PBAs (LBA1→PBA1, then LBA2→PBA2), the flash storage device may read LBA1→PBA1 from NOR, and LBA2→PBA2 from MRAM concurrently. Out-of-date FTL information in NOR is flagged, and periodically the FTL information updated in MRAM is synchronized into NOR. The FTL information in MRAM is up-to-date.

Referring back to FIG. 2, according to another embodiment, FTL 235 can use MRAM flash (not shown) for storing a metadata pool comprising FTL information. The operation procedures with this architecture are similar to the above procedures described in FIG. 3-FIG. 6.

Embodiments of the present invention are thus described. While the present invention has been described in particular embodiments, it should be appreciated that the present invention should not be construed as limited by such embodiments, but rather construed according to the following claims.

What is claimed is:

1. A flash storage device, comprising:
a NAND flash memory;
a NOR flash memory that stores a first type of data that includes a flash translation layer that maps logical block addresses to physical block addresses;
a MRAM memory that stores a second type of data; and
a memory controller coupled to the NAND flash memory, the NOR flash memory, and the MRAM memory, the memory controller to:
receive a host write request that includes a received logical block address and a block of data;
store the received logical block address and the block of data in the MRAM memory;
access the flash translation layer in the NOR flash memory to determine a translated physical block address for the block of data from the received logical block address; and
write the block of data stored in the MRAM memory to the translated physical block address in the NAND flash memory.

2. The flash storage device of claim 1, wherein:
the MRAM memory stores both the first and second types of data; and
the memory controller to receive a first logical block address with a first write request and a second logical block address with a second write request, and access in parallel the flash translation layer in the MRAM memory and the flash translation layer in the NOR flash memory to determine a first physical block address for the first logical block address from the MRAM memory and a second physical block address for the second logical block address from the NOR flash memory.

3. The flash storage device of claim 2, wherein:
the NOR flash memory includes a flash translation layer unit and a plurality of NOR flash units coupled to the flash translation layer unit; and
the NAND flash memory includes a NAND flash interface and a plurality of NAND flash units coupled to the NAND flash interface.

4. The flash storage device of claim 3, wherein the MRAM memory includes a buffer and a plurality MRAM units coupled to the buffer.

5. A flash storage device, comprising:
a NAND flash memory;
a NOR flash memory that includes a flash translation layer that maps logical block addresses to physical block addresses;
a MRAM memory; and
a memory controller coupled to the NAND flash memory, the NOR flash memory, and the MRAM memory, the memory controller to:
receive a write request that includes a received logical block address and a block of data;
store the received logical block address and the block of data in the MRAM memory;
determine a translated physical block address for the block of data, associate the translated physical block address with the received logical block address, and store the translated physical block address with the received logical block address in the MRAM memory;
write the block of data stored in the MRAM memory to the translated physical block address in the NAND flash memory;
receive a read request from a host to read requested data from a first logical block address;
determine if the first logical block address is stored in the MRAM memory;
read data associated with the first logical block address from the MRAM memory when the first logical block address is stored in the MRAM memory, and send the data read from the MRAM memory to the host;
access the flash translation layer in the NOR flash memory to determine a first physical block address that corresponds with the first logical block address when the first logical block address is not stored in the MRAM memory; and
read data associated with the first physical block address from the NAND flash memory, and send the data read from the NAND flash memory to the host.

6. The flash storage device of claim 5, wherein the memory controller to further backup data stored in the MRAM memory in the NOR flash memory.

7. The flash storage device of claim 5, wherein the memory controller to further backup data stored in the NOR flash memory in the MRAM memory.

8. The flash storage device of claim 5, wherein the memory controller to further write the received logical block address and the translated physical block address that is associated with the received logical block address and stored in the MRAM memory to the NOR flash memory to update the flash translation layer.

9. A non-transitory computer-readable medium having computer-readable instructions stored thereon to be executed by a computer, the instructions including a method comprising:
receiving a host write request that includes a received logical block address and a block of data;
storing the received logical block address and the block of data in a MRAM memory;
accessing a flash translation layer in a NOR flash memory to determine a translated physical block address for the block of data from the received logical block address; and
writing the block of data stored in the MRAM memory to the translated physical block address in a NAND flash memory.

10. The medium of claim 9 wherein the method further comprises:
    writing the received logical block address and the translated physical block address that is associated with the received logical block address and stored in the MRAM memory to the NOR flash memory to update the flash translation layer in the NOR flash memory; and
    receiving a first logical block address with a first write request and a second logical block address with a second write request, and accessing in parallel a flash translation layer in the MRAM memory and the flash translation layer in the NOR flash memory to determine a first physical block address for the first logical block address from the MRAM memory and a second physical block address for the second logical block address from the NOR flash memory.

11. A non-transitory computer-readable medium having computer-readable instructions stored thereon to be executed by a computer, the instructions including a method comprising:
    receiving a write request that includes a received logical block address and a block of data;
    storing the received logical block address and the block of data in a MRAM memory;
    determining a translated physical block address for the block of data, associating the translated physical block address with the received logical block address, and storing the translated physical block address with the received logical block address in the MRAM memory;
    writing the block of data stored in the MRAM memory to the new translated physical block address in a NAND flash memory;
    receiving a read request from a host to read requested data from a first logical block address;
    determining if the first logical block address is stored in the MRAM memory;
    reading data associated with the first logical block address from the MRAM memory when the first logical block address is stored in the MRAM memory, and sending the data read from the MRAM memory to the host;
    accessing a flash translation layer in a NOR flash memory to determine a first physical block address that corresponds with the first logical block address when the first logical block address is not stored in the MRAM memory; and
    reading data associated with the first physical block address from the NAND flash memory, and sending the data read from the NAND flash memory to the host.

12. The medium of claim 11 wherein the method further comprises backing up data stored in the MRAM memory in the NOR flash memory.

13. The medium of claim 11 wherein the method further comprises backing up data stored in the NOR flash memory in the MRAM memory.

14. The medium of claim 11 wherein the method further comprises verifying data written to the NOR flash memory and the NAND flash memory.

15. A method of writing data to a flash storage device, the method comprising:
    receiving a host write request that includes a received logical block address and a block of data;
    storing the received logical block address and the block of data in a MRAM memory;
    accessing a flash translation layer in a NOR flash memory to determine a translated physical block address for the block of data from the received logical block address; and
    writing the block of data stored in the MRAM memory to the translated physical block address in a NAND flash memory.

16. The method of claim 15, further comprising receiving a first logical block address with a first write request and a second logical block address with a second write request, and accessing in parallel a flash translation layer in the MRAM memory and the flash translation layer in the NOR flash memory to determine a first physical block address for the first logical block address from the MRAM memory and a second physical block address for the second logical block address from the NOR flash memory.

17. The method of claim 16, further comprising:
    writing the received logical block address and the translated physical block address that is associated with the received logical block address and stored in the MRAM memory to the NOR flash memory to update the flash translation layer in the NOR flash memory; and
    verifying data written to the NOR flash memory and the NAND flash memory.

18. The method of claim 16, further comprising backing up data stored in the MRAM memory in the NOR flash memory.

19. The method of claim 16, further comprising backing up data stored in the NOR flash memory in the MRAM memory.

20. A method of writing data to a flash storage device, the method comprising:
    receiving a write request that includes a received logical block address and a block of data;
    storing the received logical block address and the block of data in a MRAM memory;
    determining a translated physical block address for the block of data, associating the translated physical block address with the received logical block address, and storing the translated physical block address with the received logical block address in the MRAM memory;
    writing the block of data stored in the MRAM memory to the translated physical block address in a NAND flash memory;
    receiving a read request from a host to read requested data from a first logical block address;
    determining if the first logical block address is stored in the MRAM memory;
    reading data associated with the first logical block address from the MRAM memory when the first logical block address is stored in the MRAM memory, and sending the data read from the MRAM memory to the host;
    accessing a flash translation layer in a NOR flash memory to determine a first physical block address that corresponds with the first logical block address when the first logical block address is not stored in the MRAM memory; and
    reading data associated with the first physical block address from the NAND flash memory, and sending the data read from the NAND flash memory to the host.

* * * * *